Figure 1:
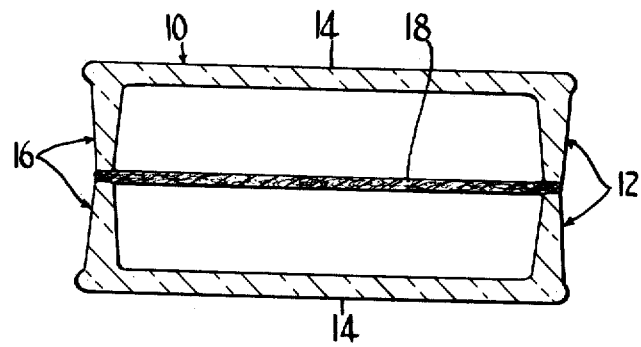

March 8, 1955 W. D. FORD 2,703,486
GLASS BUILDING STRUCTURE
Filed Aug. 17, 1948

Inventor
WALTER D. FORD

By
Oscar L. Spencer
Attorney

United States Patent Office 2,703,486
Patented Mar. 8, 1955

2,703,486
GLASS BUILDING STRUCTURE

Walter D. Ford, Port Allegany, Pa., assignor to Pittsburgh Corning Corporation, Allegheny County, Pa., a corporation of Pennsylvania Application August 17, 1948, Serial No. 44,773

4 Claims. (Cl. 72—41)

The present invention relates to mats composed of fine fibers or filaments of glass and it has particular relation to mats of such fibers in which the individual fiber elements are bonded together into a coherent unit by a suitable agent.

One object of the invention is to provide a permeable mat of bonded glass fibers which will withstand elevated temperatures and chemical or solvent agents without damage to the bond between the fibers or to the fibers.

A second object of the invention is to provide a mat of glass fibers which can be colored with heat resistant coloring materials without destruction of the bond between the individual fibers.

A third object of the invention is to provide a mat of glass fibers which is suitable for insertion between the halves of conventional hollow glass blocks employed in the building arts.

These and other objects of the invention will be apparent from consideration of the following specification and the appended claims.

Mats of fiber glass are conventionally formed of extremely fine fibers of glass which are coated with an organic binder such as starch, waxes, resins, asphaltum, casein, glue, ethyl or methyl cellulose or the like in order to bind the fibers together at points of contact into a coherent unit that can be handled or subjected to service without undue tendency to tear or otherwise to disintegrate. Such mats are satisfactory for many purposes where elevated temperatures or solvents of the binder are not encountered. However, where the latter are present, the mats are unsatisfactory, since the binder either burns out or is dissolved away to leave the fibers unbonded.

Materials that simultaneously will act as a bond for glass fibers and will withstand elevated temperatures without adverse effects upon the fibers are relatively scarce. Practically all organic binders, as already intimated, are precluded because they decompose under heat. Sodium silicate is an inorganic binder that has been suggested and is fairly heat resistant. However, in practice it is unsatisfactory because it tends to react with the fibers thereby producing embrittlement that results in quick disintegration of the fiber mats. It also tends to react with inorganic binders such as starch to produce discoloration when starch is ignited.

The present invention is based upon the discovery that very finely divided silica and notably the forms of silica known as colloidal silica constitute highly satisfactory binders for fiber glass mats which do not embrittle the fibers.

As a further feature, the present invention is based upon the discovery that mats of glass fibers bonded together by conventional organic binders such as starch or the like, can be treated with colloidal silica and then fired at appropriate temperature to burn out the organic binder and to leave the fibers of glass bonded together at their points of contact by essentially pure silica without any discoloration.

The colloidal silica contemplated as a binder in the present invention comprises an exceedingly finely divided form of silica preferably of a particle size of 1 micron in diameter and less. In most instances the average particle size will be less than .1 micron in diameter. These exceedingly finely divided forms of silica may be obtained by the number of methods well understood in the art. For example, they may be conveniently obtained by burning in air or oxygen, ethyl or methyl silicate or silicon tetrachloride. Another finely divided silica is sold under the trade name of "Ludox." It is described in "Chemical and Engineering News," vol. 25, October 27, 1947, page 3168, or "Chemical Engineering News," January 1948, page 173.

These products may be formed by treating a water solution of sodium silicate with a base exchange resin or synthetic zeolite such as is disclosed in U. S. Patent 2,367,803 and again in Patents 2,204,539, 2,228,159 and 2,244,325. The formation of the colloidal silica as previously intimated, is conventional in its nature and it is not deemed that further discussion thereof is essential to the present invention since the product can be purchased on the open market.

It is characteristic of these very finely divided forms of silica having exceedingly high specific surfaces that they tend to become hydrated or gelatinous when suspended in water. Doubtless this characteristic assists in the bonding action of the finely divided silica since it would appear that the particles would adhere to the fibers and when the latter were subsequently heated would provide a hard and strong bond between the individual fibers.

An appropriate technique to be followed in the preparation of mats of fine glass fibers suitable for the practice of the present invention would involve the provision of a mat of fine glass fibers in which a conventional organic binder is employed to obtain temporary cohesion between the individual filaments. The various binders heretofore suggested including starch, casein, glue, drying oils, asphaltum and others may be employed for the purpose. Sulfur applied in solution is contemplated. Probably one of the most satisfactory comprises ethyl or methyl cellulose.

The mat to be treated may be in the form of small individual sheets or units or it may be a continuous web of undeterminate length. The mat may be of substantially any desired thickness. Such mats may be purchased already made up. The fibers usually are in the form of a bat of fibers which may be heterogeneous in direction. The fibers may also be parallel in order to obtain desired light directing properties. They may also be woven into a fabric or braided.

In accordance with the provisions of the present invention colloidal silica may be applied to a mat containing a temporary binder by substantially any convenient technique. One method would involve spraying a suspension of the colloidal silica in water or other liquid medium. Such suspension might include colloidal silica dispersed in water in substantially any desired proportion. A suspension of 1 to 35% would seem to include a satisfactory range. An 18% suspension in water is quite good. Other ranges might be employed so long as the suspension does not tend to become too thick or viscous for spraying or for other modes of application or so long as there is sufficient silica in the suspension to assure that an adequate amount of colloidal silica to produce the desired bonding effect can be introduced into the mat with a reasonable amount of spraying.

The suspension of colloidal silica is applied directly over the organic bond or binding agent in the glass mat. One convenient method involves spraying. However, it is also contemplated that the mats may be dipped in a liquid body of the suspension. The mats may be dipped or sprayed as individual units. A continuous web that could later be cut could also be treated. One convenient method would involve suspending mats vertically and passing them between sprays that project a mist of the suspension of colloidal silica upon opposite sides simultaneously. The mats might also be conducted under sprays or through an appropriate bath of colloidal silica while they were upon an endless conveyor or belt. The mats, after the spraying preferably, are fired at a temperature sufficiently high to burn out the organic binder, e. g. starch, but not so high as to cause the glass fibers to be fused together to an objectionable degree. A temperature of about 900 to 1200° or 1300° F., e. g. 1200° F. would seem to be satisfactory but lower temperatures may be permissible where the organic binder is sufficiently combustible. Higher temperatures if they do not soften the fibers are contemplated. The finished mats are still fibrous and act as light diffusing agents, but it is a characteristic of the colloidal silica binder that, as the temporary binder is consumed or volatilized in the firing operation there is no staining of the mat in firing. The colloidal silica becomes anchored to the surfaces of the glass fibers and thus at their points of contact with each other produces a permanent heat resistant and solvent resistant union. This union as previously intimated perhaps is enhanced by the more or less hydrated nature of particles of silica at the time they are deposited upon the fibers. This silica becomes dehydrated when the mat is heated. The final deposits are essentially pure silica.

It is also contemplated to employ soluble, temporary binders such as asphaltum or dextrine and to dissolve them out after the colloidal silica has been applied by use of a solvent such as naphtha or water.

For some purposes, it may be desirable to color the mats with appropriate agents. Usually, the coloring matter should be of a heat resistant nature. Appropriate coloring matters may comprise finely pulverized glass like frits or glazes. The finely divided frit may for example be applied to the mat as a suspension in a water solution of sodium silicate. The colloidal silica will protect the glass fibers from the sodium silicate. The sodium silicate will bind the pulverulent coloring matter on the fibers. The formation of frits and glazes is not particularly a feature of the present invention since the art is well developed. An appropriate glaze having a fusing point lower than that of the glass composing the fibers may be selected. Cobalt aluminate of a cobalt content of 5 to 20% cobalt calculated as oxide is satisfactory. The cobalt aluminate is blue and may be dissolved in or incorporated in a low fusing glass, e. g. one fusing at 1100 or 1200° F. It is characteristic of the present process that since organic binders are not present in the glass mats, the coloring agents in the glaze or frit are not decomposed or altered by reason of a reducing action produced by the organic binder during the operation of firing the frit upon the fibers. Fibers of colored glass could also be employed in forming the mats.

Light diffusion and light absorption properties of the mat may also be controlled merely by spraying the mat after it has been treated with colloidal silica, with a solution of sodium silicate. It will form films when heated to increase the light scattering power of the mat.

The mats embodying colloidal silica as a binder as here disclosed are susceptible of many uses. For example, they may be used as filters or as heat insulation. There resistance to solvents and heat are ideal for such uses. As previously intimated, they are particularly desirable where the mats are exposed to high temperatures, for example as insulation for furnaces or the like. The mats are further especially valuable for interposition between the halves of glass blocks employed in the building art. This is true because the mats can be inserted between the halves and then the halves can be welded together to consolidate or seal the portions of the fibers in the joints with glass of the blocks without fusing down the mat or without burning out the binder to leave the fibers in free unbonded state. The fibers act as light diffusing and light directing elements. They may also act to impart color to the blocks, if colored fibers are employed.

The methods disclosed in O. W. Wiley patents 2,261,011 and 2,297,337 may be employed in forming blocks embodying the mats.

Figure 2:
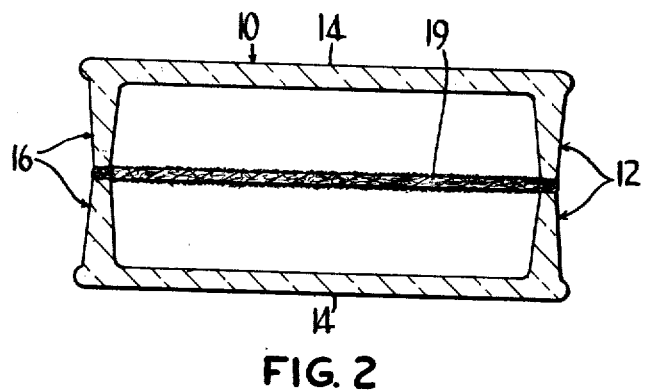

Such blocks are shown in the drawing in which:

Fig. 1 is a sectional view of a glass building block having a glass fiber mat bonded together by means of colloidal silica inserted between the edges of the block, and Fig. 2 is a sectional view of a glass block such as is shown in Fig. 1 illustrating a further embodiment of the invention.

In the drawing, a hollow glass block 10 is shown. This block 10 is made up of two tray-like sections 12 comprised of faces 14 and integral edge flanges 16. In Fig. 1 a glass fiber mat 18 whose fibers are bonded together by means of colloidal silica in accordance with the present invention is shown welded between the edges 16 of the block. In Fig. 2 a glass fiber mat 19 having the fibers bonded together with colloidal silica and having finely powdered, colored, glass-like frits adhered to the fibers is shown inserted within the welded edges 16.

In order to promote the bonding of the halves of glass at the line of weld, it is sometimes desirable that the mat include appropriate fluxes for glass. One such flux comprises low melting glass, that is, a glass melting somewhat below the melting point of the fibers, e. g. at 1100° F., which in finely powdered form may be applied to the mat or to the edge portions of the mat where the edges of the two halves of the glass blocks contact with each other. The fluxes in powdered form may be simply dusted over the mat or those portions of the mat which are to be treated or the edge portions of the mat might be dipped into a suspension of flux.

The glass fiber mats of the present invention are well suited for interposition between the sections of a glass block for purposes of diffusing the light passing therethrough or reducing the amount of light or imparting appropriate coloration to the light transmitted. Needless to say, the mats as received, are well adapted for application other than in glass blocks. They may, for example, be inserted between plates of glass to provide units adapted for use as double glazed units or for imparting color to the light, or for diffusing the light. The mats can also be employed as heat insulation around pipes, furnaces or other apparatus which it may be desirable to insulate.

It will be apparent to those skilled in the art that the forms of the invention herein described are by way of illustration. It will be apparent that other modifications may be made therein without departure from the spirit of the invention or the scope of the appended claims.

I claim:

1. A hollow glass block suitable for forming a light-transmitting unit for a wall of a building, which glass block comprises two sections welded together at their meeting edges and having a mat of glass fibers disposed between the welded edges and cohered therein, the mat comprising unwoven fibers of glass which are bonded together into a coherent mat at their points of contact with each other by means of colloidal silica.

2. A hollow glass block suitable for forming a light-transmitting unit for a wall of a building, which glass block comprises two sections welded together at their meeting edges and having a mat of glass fibers disposed between the welded edges and cohered therein, the mat comprising unwoven fibers of glass which are bonded together into a coherent mat at their points of contact with each other by means of colloidal silica and including a finely powdered, colored, glass-like frit having a fusing point lower than that of the glass composing the fibers adhered upon the fibers.

3. A hollow glass building structure suitable for forming a light-transmitting unit for a wall of a building, which glass structure comprises two sections welded together at their edges and having a mat of glass fibers disposed between the welded edges and cohered therein, the mat comprising unwoven fibers of glass which are bonded together into a coherent mat at their points of contact with each other by means of colloidal silica.

4. A hollow glass building structure suitable for forming a light-transmitting unit for a wall of a building, which glass structure comprises two sections welded together at their edges and having a mat of glass fibers disposed between the welded edges and cohered therein, the mat comprising unwoven fibers of glass which are bonded together into a coherent mat at their points of contact with each other by means of colloidal silica and including a finely powdered, colored, glass-like frit having a fusing point lower than that of the glass composing the fibers adhered upon the fibers.

References Cited in the file of this patent

UNITED STATES PATENTS

| Number | Name | Date |
| --- | --- | --- |
| 1,771,216 | Gossler | July 22, 1930 |
| 1,804,254 | Friedrich | May 5, 1931 |
| 2,027,931 | Ray | Jan. 14, 1936 |
| 2,221,649 | Mulford | Nov. 12, 1940 |
| 2,273,733 | Paddock | Feb. 17, 1942 |
| 2,297,337 | Wiley | Sept. 29, 1942 |
| 2,408,656 | Kirk et al. | Oct. 1, 1946 |
| 2,433,292 | Perloff | Dec. 23, 1947 |
| 2,444,347 | Greger | June 29, 1948 |
| 2,481,390 | Campbell | Sept. 6, 1949 |
| 2,500,665 | Courtright | Mar. 14, 1950 |
| 2,517,753 | Ximenez | Aug. 8, 1950 |
| 2,570,830 | McCarthy | Oct. 9, 1951 |

FOREIGN PATENTS

| Number | Country | Date |
| --- | --- | --- |
| 20,289 | Great Britain | 1890 |
| 12,383 | Great Britain | 1894 |
| 559,068 | Great Britain | Feb. 2, 1944 |

UNITED STATES PATENT OFFICE
CERTIFICATE OF CORRECTION

Patent No. 2,703,486                                          March 8, 1955

Walter D. Ford

It is hereby certified that error appears in the printed specification of the above numbered patent requiring correction and that the said Letters Patent should read as corrected below.

Column 1, line 53, for "inorganic" read --organic--.

Signed and sealed this 5th day of April, 1955.

(SEAL)

Attest:

E. M. MURRY
Attesting Officer

ROBERT C. WATSON
Commissioner of Patents